June 4, 1968 E. SCHULZE ET AL 3,386,579
METHOD OF AND APPARATUS FOR DETECTING LIGHT-DEFLECTING
FLAWS IN HOLLOW GLASS ARTICLES
Filed Aug. 20, 1965 5 Sheets-Sheet 1

Ernst Schulze
Gustav Becker
INVENTORS.

BY Karl F. Ross
Attorney

Ernst Schulze
Gustav Becker
INVENTORS.

BY Karl F. Ross
Attorney

INVENTORS:
Ernst Schulze
Gustav Becker

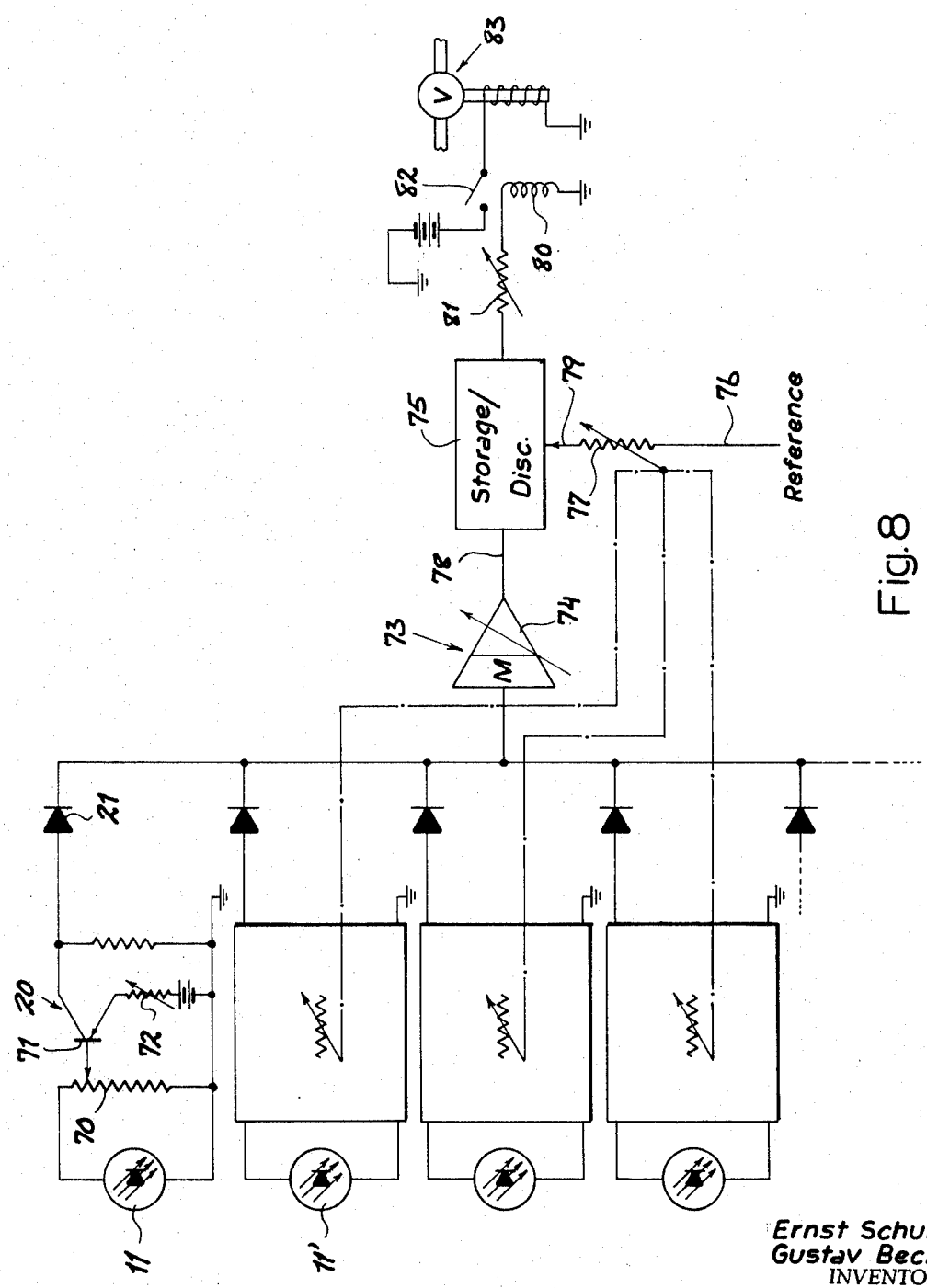

United States Patent Office 3,386,579
Patented June 4, 1968

3,386,579
METHOD OF AND APPARATUS FOR DETECTING LIGHT-DEFLECTING FLAWS IN HOLLOW GLASS ARTICLES
Ernst Schulze, Harsewinkel 14, Gladbeck, Germany, and Gustav Becker, Am Bockler Baum 21, Essen-Kray, Germany
Filed Aug. 20, 1965, Ser. No. 481,179
Claims priority, application Germany, Aug. 22, 1964, St 22,575
13 Claims. (Cl. 209—111.7)

ABSTRACT OF THE DISCLOSURE

Method of and apparatus for detecting light-deflecting flaws in glass bottles and other round glass articles (e.g., cracks and chips) wherein a single lamp is provided in axial alignment with the article and from this lamp a plurality of light beams are reflected by mirrors of different angular orientation and axial spacing from the source tangentially against a region of the bottle, and a plurality of light detectors are trained on this region to generate respective signals arising from deflection of the light beams by the flows. Circuitry compares the output signal with a predetermined threshold to reject or pass the article.

---

Our present invention relates to a method of and apparatus for detecting light-deflecting flaws (e.g., cracks, fissures, chips, holes, air inclusions) in hollow round glass articles and, fore particularly, to a method and apparatus of this character for sorting defective articles from flawless objects.

In the manufacturing and use of hollow round glass articles, such as jars, bottles and similar glass containers, it has been proposed to subject the articles to automatic optical testing in order to ascertain the presence or absence of defects and flaws. As previously noted, the defects to be detected by such methods included fissures, cracks and the like which gave rise to reflected rays of light when subjected to translumination or glancing illumination by a light source. The apparatus used for this purpose thus included a light source, optical means such as mirrors, prisms and lenses, photoelectric means responsive to the reflected rays, and a circuit connected with the photoelectric means for energization thereby to sort or classify the article. The conventional systems, however, were characterized by at least one significant drawback, namely, an inaccurate and unsatisfactory detection of fissures and cracks. This disadvantage apparently derives from the fact that the reflective surfaces of the fissures tend to deflect the light rays in a multiplicity of directions so that frequently a reflected ray, indicative of a flaw in the glass article, fails to fall upon the photoelectric means and provide an indication of the defect. While theoretically this difficulty could be eliminated by providing a large number of photoelectric devices about the periphery of the article, in practice this procedure has not been found to be realistic because it is not only cumbersome and expensive but also involves extremely complex circuitry and support structure. In fact, because of the multitudinous paths of the light rays from a fissure or crack of limited extent, almost an infinite number of photoelectric devices would have to be disposed about the periphery of the article in accordance with known techniques in order to provide a true indication of the presence of flaws in the article. Thus it has not been possible hitherto to provide a satisfactory detection of flaws in such articles.

It is, therefore, the principal object of the present invention to provide an improved and relatively simple method of detecting light-deflecting flaws in hollow round glass articles whereby the aforementioned difficulties can be obviated.

A further object of this invention is to provide an apparatus of the general character described for detecting flaws with assurance and for sorting or otherwise classifying the articles.

Still another object of our invention is to provide a method and an apparatus for the detection of flaws and the sorting and classifying of glass articles in accordance with the presence or absence of defects which is also responsive to the extent of the flaw.

These objects and others which will become apparent hereinafter are attained, in accordance with the present invention, by a method of detecting flaws in hollow round glass articles by directing a number of light beams simultaneously from a plurality of respective light sources generally tangentially against a limited peripheral region of the article, preferably a point, to generate deflected rays upon the presence of a flaw in the vicinity of the incident region; training simultaneously on this region a plurality of spaced-apart detectors responsive to the deflected rays and adapted to generate respective signals corresponding thereto; collecting the signals with suitable electronic circuitry, preferably after amplification, in a "mixer" or other storage or comparator means; and classifying the article in accordance with the collected signal generated in the last-mentioned circuit. The classification or sorting of the article into two or more categories (e.g., defective and flawless) can be carried out by a switching device operated by the mixing stage. When reference is made herein to a plurality of light sources, it should be noted that these light sources, accordance to the present invention, comprise a common lamp or illuminating device and a plurality of spaced-apart light-convering mirrors receiving illumination from the lamp and focusing their respective light rays upon the incident region of the body.

Thus the apparatus, in accordance with the present invention, can comprise a lamp or other light source disposed above the upwardly open mouth of the hollow glass article, generally a bottle, a jar or other container in axial alignment therewith while a plurality of mirrors are axially offset about the article in a common housing with the lamp, thereby permitting joint rotation of the lamp and the mirrors. This arrangement is particularly advantageous in that it eliminates the possibility of interference when the lamp is a line or point source and has eccentricities or deformations in its envelope.

According to a more specific feature of this aspect of the invention, the photoelectric means for detecting the reflected light rays are angularly spaced apart about the periphery of the article and are axially offset from one another while being trained upon the incident region of the article directly or via respective optical systems and are received, together with these systems, in the aforementioned common housing. Moreover, the preamplifier means which we prefer to employ with the photocells, any main amplifier means and the mixing circuit or stage described above are also included within the housing whose output is transmitted to a sorting mechanism via slip rings and brushes upon rotation of the housing about the glass article to sweep the incident region around the periphery thereof. This common-housing arrangement also facilitates the relatively axial displacement of the detecting apparatus and the article during relative rotation so that an examination of the entire article or only the most significant portions thereof is possible. In this manner, a rapid and simple examination of each point on the surface of a hollow glass body is possible with assurance that any cracks or other light-deflecting flaws will be determined.

According to another aspect of the present invention, the circuitry of the detector is provided with means, removed from the housing, for establishing a threshold for operating the sorting or classifying means so that detectable defects of insignificant extent do not result in classification of the article with the defective group. The apparatus is thus adjustable so that minute flaws do not result in rejection of the article. Another advantage of the use of a common housing for the apparatus is that the light source or lamp may be mounted axially within this housing so that its filament lies precisely along the axis of rotation whereby the effect of centrifugal force upon the lamp will be nullified. It will be understood, however, that the relative axial and rotary displacement of the detecting apparatus and the article can be carried out by rotating the article while the detecting apparatus remains stationary and by holding the detecting apparatus in a set vertical position while elevating and lowering the article.

According to still another feature of this invention, the photoelectric cells are arrayed in at least one group having a common vertical plane intercepting the surface of the article at the incident point; optical means including, for example, at least one refractive means (e.g., a prism) and at least one reflective means (e.g., a condensing lens), can then be disposed between each photoelectric cell and the incident point to bend the reflected light ray toward the respective photocell. The photocells can thus be arranged in close proximity and in superimposed relationship within the housing in a common vertical plane while providing a considerable detection angle in this vertical plane to ensure the gathering of the deflected rays. A similar arrangement of photocells in angularly offset relationship and in respective horizontal planes can guarantee a wide horizontal detection aperture as well.

The photoelectric cells are preferably photoelectric generators requiring no external source of current or activating voltage; thus the photoelectric device can be silicon photodiodes of the type capable of generating an electromotive force upon illumination by light. We have found that it is desirable and important to provide means for adjusting the sensitivity of the photoelectric elements so that, in advance of measurement, it is possible to adjust all of the photoelectric devices and their respective circuitry to a common light sensitivity. For this purpose each of the photoelectric devices is advantageously connected in circuit with a potentiometer allowing the sensitivity of the photoelectric means to be adjusted between 0 and 100% with the aid of a flawless article so that the outputs of all the photoelectric devices are identical. This ensures that an inadvertently high sensitivity of one of the devices will not trip the sorting mechanism in response to a minute flaw. The output voltage of the photoelements can thus be communicated to a transistor preamplifier via the potentiometer, connected as a voltage divider, the transistor-amplifier outputs being channeled via respective diodes to the mixing, combining or accumulating stage. The latter can be a conventional mixer for combining the outputs of the preamplifier and can include a main amplifier for further augmenting the signal. When the mixing stage functions simply as a signal accumulator, it can be constituted by a capacitor connected in an RC circuit so dimensioned that, when the pulses corresponding to the reflected rays are significant, the capacitor charges to a level above a threshold value to initiate operation of the sorting means; the stored charge can be dissipated between tests of successive articles. The mixing stage can be connected with a conventional discriminator (provided with reference signal), a relay or the like, which is provided with potentiometers for regulating the input voltage and the threshold value of the system. Thus, after the amplitudes of the several photocells are adjusted to the identical value, the threshold voltage can be established, thereby determining the tolerance range. When the output of the photoelectric cells, after amplification, exceeds the threshold voltage, a signal is transmitted to the relay which sets in operation the sorting device either immediately or after a delay permitting displacement of the article along the transporting apparatus and subsequent sorting.

The above and other objects, features and advantages of the present invention will become more readily apparent from the following description, reference being made to the accompanying drawing in which:

FIG. 8 is a circuit diagram, partially in broken form, illustrating other features of the invention.

Figure 1:
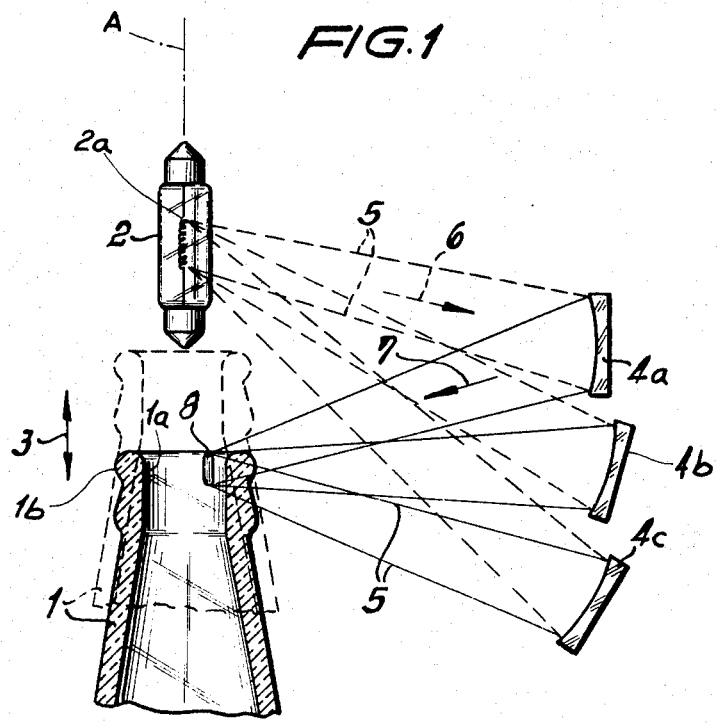
FIG. 1 is a diagrammatic cross-sectional view of the several light sources of an apparatus in accordance with the present invention.
Figure 2:
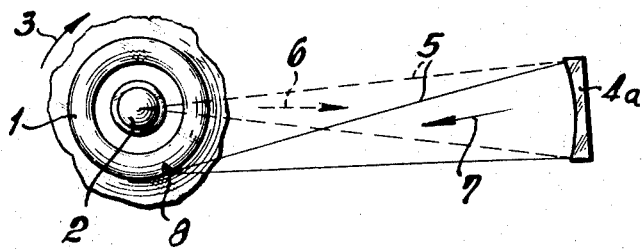
FIG. 2 is a diagrammatic plan view of the portion of the apparatus shown in FIG. 1.

In FIGS. 1 and 2 we show a glass bottle 1, constituting the tubular round glass article to be examined, which is in axial alignment with a lamp 2 whose filament 2a lies along the axis A of the flask 1 above the open mouth 1a thereof. As is indicated by arrow 3, the bottle 1 is vertically shiftable to permit scanning, by the apparatus, of the entire periphery of the body. The bottle or the light source can be rotatable to sweep the scanning beams around the periphery of the bottle as well. Laterally of the bottle 1, we provide a plurality of concave and thus light-convergent mirrors 4a, 4b, 4c, vertically spaced from one another and at different angular orientations as shown in FIG. 1. The light beams 5 from the lamp 2 are received by the mirrors 4a–4c and are projected against a limited peripheral region 8 of the body 1 as indicated by the arrows 6 and 7. Advantageously, the reflecting surfaces of mirrors 4a–4c have their foci at 8. Preferably, this limited region is a point although when the filament 2a extends axially to preclude the effects of centrifugal force, a more or less linear incident region 8 will result. From FIG. 2, it will be seen that the light beam projected against the body 1 impinges generally tangentially against the lip 1b of the latter.

Figure 3:
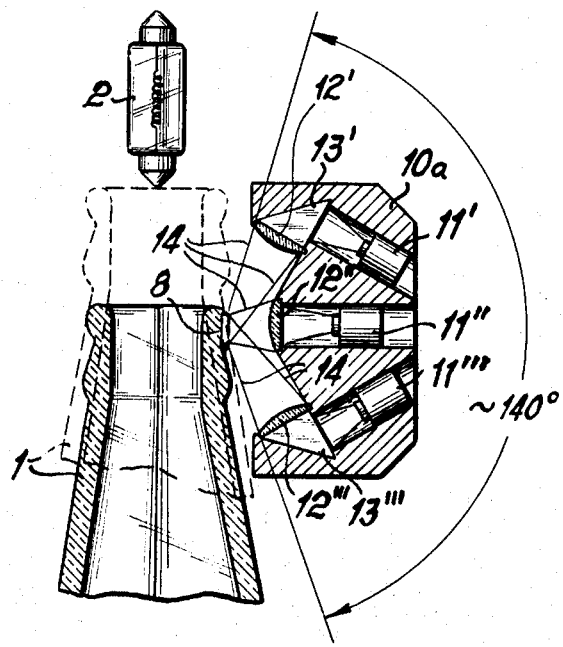
FIG. 3 is a schematic elevational view in vertical cross-section, showing the arrangement of the photoelectric cells.
Figure 4:
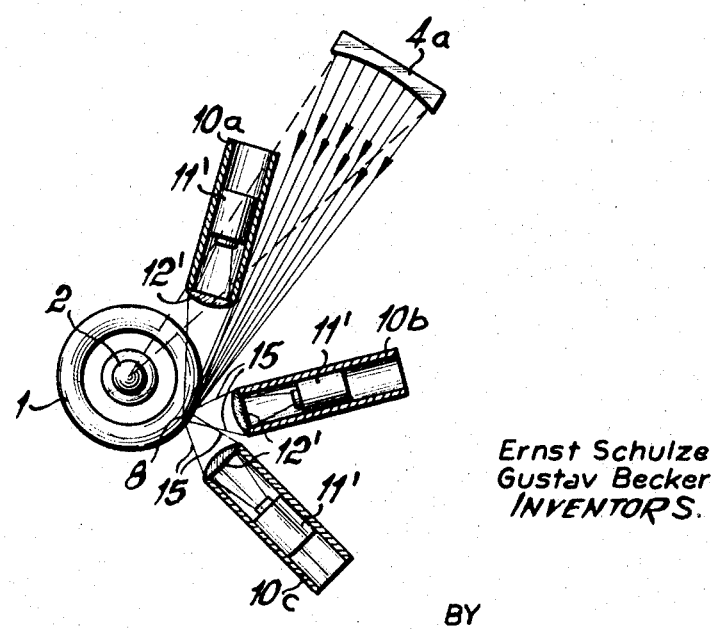
FIG. 4 is a diagrammatic plan view of the apparatus of FIG. 3.
Figure 5:
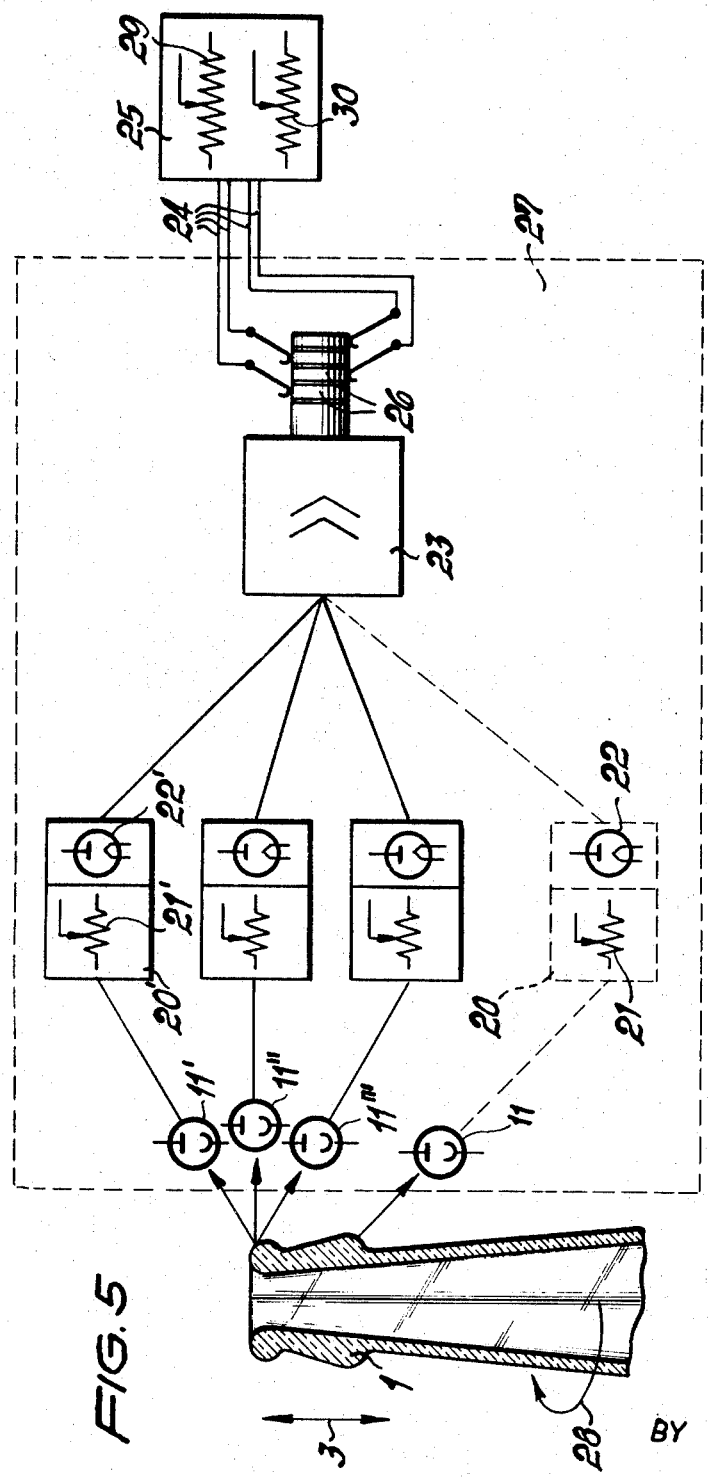
FIG. 5 is a block diagram of the system of the present invention.

As can be seen from FIGS. 3 and 4, the photoelectric means comprises a plurality of angularly spaced mounts 10a, 10b and 10c which define an aperture in the horizontal plane of substantially 160° (FIG. 4) and each includes a plurality of vertically spaced photoelectric cells 11', 11" and 11'''. These photoelectric cells have their apertures 14 and 15 trained upon the incident region 8 and in overlapping or mutually-bounding relationship so that within the horizontal detection-aperture angle of about 150° and the vertical detection-aperture angle of about 140°, no reflected ray can pass from the region 8 without interception by one of the photoelectric devices. Each photoelectric element 11', 11", 11''' is, for the sake of compactness, provided with a respective continuing lens 12', 12", 12''', while the photocells 11' and 11''' disaligned with respect to the incident region 8 are provided with respective prisms 13', 13''' so that they too are trained upon this region. It will be understood, of course, that added photocells and wide-angle lenses can widen still further the detection apertures in the horizontal and vertical planes.

As can be seen from the block diagram 5, each of the photoelectric cells 11, 11' etc. is provided with a respective preamplifier 20, 20' etc. whose sensitvity is adjustable by means of a respective potentiometer 21, 21' etc.; the outputs of the preamplifiers are communicated via respective rectifying diodes 22, 22' etc. to a common mixing stage which is in circuit via conductors 24 with a discriminator 25 or a relay. The connection of conductors 24 with the detection system contained within rotatable housing 27 is effected via slip rings 26. The housing 27 is thus rotatable around the periphery of the bottle 1 in the direction of arrow 28. During rotation of the housing 27, it is impossible to impart thereto a vertical movement or to vertically displace the bottle 1, thereby sweeping the entire surface of the bottle with the incident beam.

The apparatus illustrated generally in FIGS. 1–5 operates in the following manner After initial adjustment of the concave mirrors 4a, 4b, 4c so that the incident rays fall tangentially upon the surface of the article and positioning of the photoelectric cells 11, 11' etc. and the respective optical systems so that they are trained upon the region 8, a flawless bottle is disposed in the apparatus and the potentiometers 21, 21' etc. are adjusted so that the outputs of the photoelectric cells are below the triggering level of the relay 25. The potentiometers 29 of the preamplifiers 20, 20' etc. are then adjusted to establish the threshold value thereby determining the tolerance range above the previously adjusted amplitudes of the photoelectric elements. Upon the development of a voltage above the threshold value the relay 25 is operated to trigger the sorting mechanism. A potentiometer 30 establishes the input voltage level at the relay 25. It will be understood that the housing 27 can be made annular and provided with a number of measuring arrays in order to increase still further the efficiency of the apparatus. Moreover, when the apparatus is used in conjunction with the conveyor system, a signal storage device can be provided to operate the sorting means at a subsequent stage in transport of the bottle.

Figure 6:
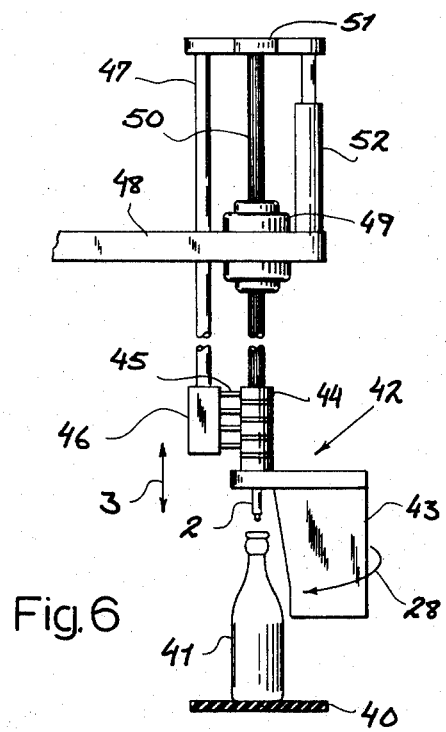
FIG. 6 is a vertical elevational view, partly in cross-section, of an apparatus embodying the invention.

Referring now to FIG. 6 of the drawing, I show a conveyor band 40 for carrying the bottles 41 into the region of the detecting station 42. The latter has a housing 43 which may be considered to be the housing 27 of FIGS. 1–5 and contains the mirror and photocell assemblies of FIGS. 1–4. The axially disposed lamp of the apparatus is shown at 2 while the slip rings 44, corresponding to the previously described slip rings 26, are seen to be in contact with brushes 45 in a brush housing 46. The latter is vertically displaceable on a rod 47 with respect to the bottle 41 and a support structure 48. The support 48 carries a motor 49 whose vertically shiftable splined shaft 50 is journaled in a bracket 51 and carries the slip ring 44 and the housing 43. Bracket 51 also engages the rod 47 and is vertically shiftable by a pneumatic cylinder 52. Thus the pneumatic cylinder 52 can vertically displace the housing 43 in the direction of arrow 3 while the motor 49 rotates the housing as indicated by arrow 28. The detecting operation of the apparatus has been described above.

Figure 7:
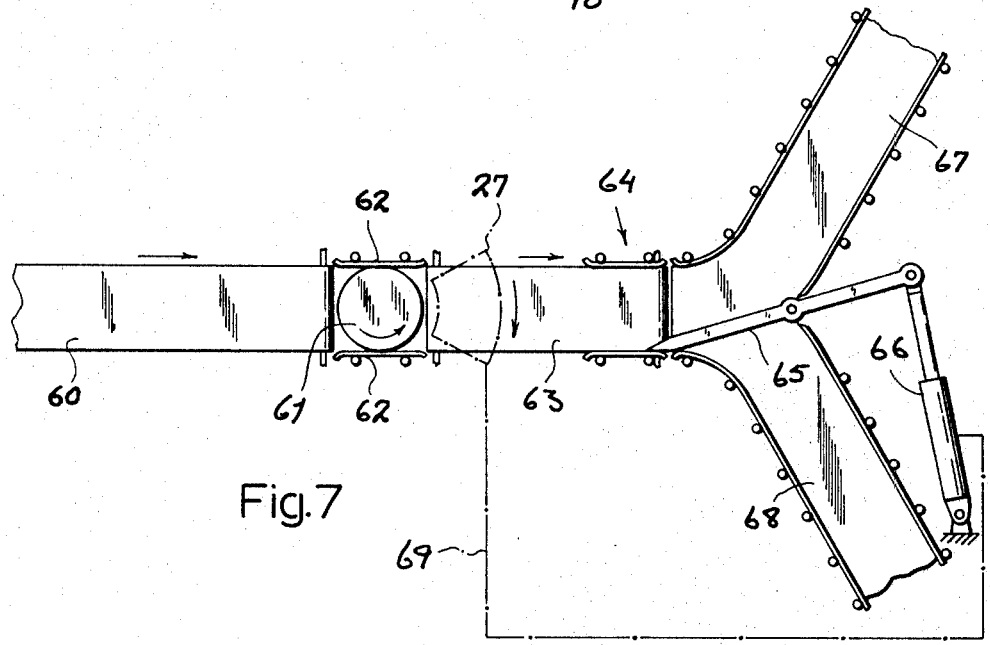
FIG. 7 is a diagrammatic plan view of another apparatus according to the invention.

Each of the systems described through FIGS. 1–5 can co-operate with the assembly shown in FIG. 7 wherein a conveyor 60 serves to feed the bottles to a detecting station at which the housing 27 (represented by dot-dash lines) is provided. A vertically displaceable and rotatable turntable 61 can serve to raise and lower the bottle when the housing 27 is stationary and to rotate the bottle. Guides 62 prevent lateral shifting of the bottle and similar guides may be provided in the conventional manner along the conveyors. A further conveyor 63 carries the bottles to the sorting station 64 at which a gate 65 is swingable by a pneumatic cylinder 66 to divert the bottles either along a first transport path 67 for flawless bottles and a second transport path 68 for defective bottles. The pneumatic cylinder 66 is actuated under the control of the detection system as indicated by the dot-dash line 69.

As can be seen from FIG. 8, the photoelectric cells 11, 11' etc. can be bridged by voltage-dividing potentiometer 70 adapted to adjust the output amplitude of the silicon photodiodes between 0 and 100% of maximum output. Each transistor amplifier 20, etc. can then include a transistor 71 having a potentiometer 72 for establishing the amplification level, the collector output being transmitted over the diodes 21 etc. to a mixer 73 whose amplifier stage 74 is adjustable to raise and lower the output presented to a storage device and discriminator 75 acting as a comparator. The discriminator 75 can be supplied with a reference voltage from a line 76 having a potentiometer 77 to establish a threshold level. When the output of the detection system delivered at line 78 exceeds the potential at line 79, a relay 80 can be triggered directly or via further amplification. A potentiometer 81 serves to adjust the input voltage of the relay 80 whose contacts 82 are in circuit with a solenoid valve 83 controlling operation of the pneumatic cylinder 66. When the relay 80 is energized, the valve opens to energize the cylinder 66 and swing the gate 65 so that the previously tested bottle will be deflected along the transport path 68.

The invention described and illustrated is believed to admit of many modifications within the ability of persons skilled in the art, all such modifications being considered within the spirit and scope of the appended claims.

We claim:

1. A method of detecting light-deflecting flaws in a hollow round glass article having an axis, comprising the steps of:

positioning a lamp in axial alignment with said article;

directing simultaneously, from a plurality of light sources axially offset from one another and of different angular orientation, a plurality of respective light beams all derived from said lamp against a limited peripheral region of said article to generate deflected rays upon the presence of a flaw in the vicinity of said region;

simultaneously training on said region a plurality of spaced-apart light detectors responsive to said deflected rays and adapted to generate respective signals corresponding thereto;

rotating said article and said sources relatively about said axis to sweep said beams around the periphery of said article;

axially displacing said sources and said article relatively;

collecting said signals; and classifying said article in accordance with the collected signals.

2. An apparatus for detecting light-defecting flaws in a hollow round glass article having an axis, comprising a lamp; means for positioning said article in axial alignment with said lamp; a plurality of light sources axially offset from one another and of different angular orientations receiving light rays from said lamp for simultaneously directing a plurality of respective light beams derived from said lamp against a limited peripheral region of said article to generate deflected rays upon the presence of a flaw in the vicinity of said region; means for relatively rotating said article and said sources about said axis; a plurality of axially offset light detectors angularly spaced about said article and simultaneously trained on said region while being responsive to said deflected rays and adapted to generate respective signals corresponding thereto; a mixer circuit connected with said light detectors for collecting said signals; and means connected with said mixer circuit and operable thereby for classifying said article in accordance with the collected signals.

3. An apparatus for detecting light-deflecting flaws in a hollow round glass article, comprising a plurality of light sources axially offset from one another and of different angular orientations for directing a plurality of respective light beams generally tangentially against a limit peripheral region of said article to generate deflected rays upon the presence of a flaw in the vicinity of said region; a plurality of axially offset light detectors angularly spaced about said article and simultaneously trained on said region while being responsive to said deflected rays and adapted to generate respective signals corresponding thereto; a mixer circuit connected with said light detectors for collecting said signals; and means connected with said mixer circuit and operable thereby for classifying said article in accordance with the collected signals, said light sources being constituted by respective concave mirrors focused on said region, and a lamp axially aligned with said article for projecting light onto said mirrors.

4. An apparatus as defined in claim 3, further comprising common housing means for said mirrors, said light detectors and said mixer circuit, means for rotating said housing means about the axis of said article, and slip-ring means on said housing means for connecting said mixer circuit with the means for classifying said article.

5. An apparatus as defined in claim 4 wherein said lamp is mounted on said housing means at the axis of rotation thereof.

6. An apparatus as defined in claim 4, further comprising means for axially displacing said housing means concurrently with rotation thereof.

7. An apparatus as defined in claim 4, further comprising means for axially displacing said article relatively to said housing means.

8. An apparatus as defined in claim 4 wherein said article has a vertical axis and said light detectors include at least one array of photoelectric devices disposed in a common vertical plane, and light-bending optical means between at least some of the devices of said array and said region and trained thereon.

9. An apparatus as defined in claim 4, further comprising a potentiometer in circuit with each of said light detectors for adjusting the sensitivity thereof and the output signal supplied by the respective light detector to said mixer circuit.

10. An apparatus as defined in claim 8 wherein said optical means have light-collecting apertures in mutually overlapping relationship with one another and the optical means of adjacent arrays.

11. An apparatus as defined in claim 9, further comprising comparison means connected with said mixer circuit and provided with a potentiometer for establishing a threshold for operation of the means for classifying said article.

12. An apparatus as defined in claim 9 wherein each of said light detectors includes a transistor preamplifier supplied with an input signal from the respective detector, and a rectifier diode connected between the respective preamplifier and said mixer circuit.

13. An apparatus as defined in claim 12, further comprising a potentiometer connected with said preamplifiers for establishing an operation threshold thereof.

References Cited

UNITED STATES PATENTS

| | | | |
|---|---|---|---|
| 3,027,798 | 4/1962 | Mathias | 250—224 X |
| 3,098,565 | 7/1963 | Fouse et al. | 209—117.7 |
| 3,197,647 | 7/1965 | Fraenkel | 209—111.7 X |
| 3,262,561 | 7/1966 | Sorbie | 209—111.7 X |
| 3,267,796 | 8/1966 | Mathias | 209—111.7 X |

ALLEN N. KNOWLES, *Primary Examiner.*